US007853700B2

(12) United States Patent
Lee et al.

(10) Patent No.: US 7,853,700 B2
(45) Date of Patent: *Dec. 14, 2010

(54) ONLINE SYSTEM AND METHOD FOR DYNAMIC SEGMENTATION AND CONTENT PRESENTATION

(75) Inventors: Jonas Lee, New York, NY (US); Isaac Lidsky, Cambridge, MA (US); Joseph Zawadski, New York, NY (US); Michael Lamb, New York, NY (US)

(73) Assignee: [X+1] Solutions, Inc., New York, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 11/960,813

(22) Filed: Dec. 20, 2007

(65) Prior Publication Data
US 2008/0097832 A1 Apr. 24, 2008

Related U.S. Application Data

(63) Continuation of application No. 10/007,789, filed on Nov. 7, 2001, now Pat. No. 7,313,622.

(60) Provisional application No. 60/246,966, filed on Nov. 8, 2000.

(51) Int. Cl.
*G06F 15/16* (2006.01)
*G06F 12/00* (2006.01)

(52) U.S. Cl. .......................................... 709/227; 705/10

(58) Field of Classification Search ................. 709/203, 709/223–227, 229; 705/10, 14
See application file for complete search history.

(56) References Cited

U.S. PATENT DOCUMENTS

| 6,654,725 B1 * | 11/2003 | Langheinrich et al. .... 705/14.52 |
| 6,757,740 B1 * | 6/2004 | Parekh et al. ............... 709/245 |
| 6,839,680 B1 * | 1/2005 | Liu et al. ...................... 705/10 |
| 7,313,622 B2 * | 12/2007 | Lee et al. ..................... 709/227 |
| 7,315,826 B1 * | 1/2008 | Guheen et al. ................. 705/7 |
| 2002/0099812 A1 * | 7/2002 | Davis et al. ................. 709/224 |

* cited by examiner

*Primary Examiner*—Zarni Maung
(74) *Attorney, Agent, or Firm*—Abelman, Frayne & Schwab

(57) ABSTRACT

An on-line system and method assembles, stores, and administers all of a company's merchandising content in a single location, and optimizes the effectiveness of the content by determining the content and format most likely to be of interest to the consumer. Generally, a merchant sets up at least one campaign in the system, by generating various objects and/or resources comprising merchandising content. The merchant and/or its advertiser then establishes a set of rules which are applied to determine the objects and resources of the campaign to be distributed to a consumer, based on various circumstances and scenarios. When the consumer interacts with the system, the system determines dynamically the merchandising content to be sent to the consumer by processing data corresponding to the consumer, the consumer's computer system and environmental and geographical data.

14 Claims, 7 Drawing Sheets

FIG. 1B

RULE STORAGE MODULE (150)

| RULE # | RULE SET | SIZE | RESTRICTIONS |
|---|---|---|---|
| ... | ... | ... | ... |

FIG. 1C

OBJECT DISPATCH MODULE (160)

| OBJECT # | OBJECT TYPE | RESOURCES | ATTRIBUTES |
|---|---|---|---|
| ... | ... | ... | ... |

ONLINE SYSTEM AND METHOD FOR DYNAMIC SEGMENTATION AND CONTENT PRESENTATION

CROSS-REFERENCE TO RELATED APPLICATIONS

Continuation of U.S. application Ser. No. 10/007,789, filed on Nov. 7, 2001, now U.S. Pat. No. 7,313,622, which claims the benefit of priority from U.S. Provisional Patent Application No. 60/246,966 entitled Business Model and Applications For Internet Retail and E-Tail Platforms, filed on Nov. 8, 2000, each of which applications is hereby incorporated by reference as fully as if set forth in its entirety.

FIELD OF THE INVENTION

This invention relates to web advertising, and more specifically to a system and method for dynamically assembling, storing and providing advertising content in order to achieve optimal merchandising effectiveness.

BACKGROUND OF THE INVENTION

There are countless retail merchants that now offer products or services for sale over the Internet, and which deliver physical merchandise to customers in response to orders placed over the Internet. As this type of business—also referred to as "e-commerce"—continues to expand, advertising over the Internet will continue to play an increasingly large role in what products are actually purchased by web users. One concern about such on-line advertising is the extent of its effectiveness. Advertisers constantly seek better and more efficient arrangements for determining how effective an advertising campaign has been, so as to allocate their advertising budget in the most appropriate fashion.

There are currently several advertising schemes that are employed to measure the effectiveness of an advertising campaign on the Internet. One scheme, that endeavors to accurately estimate the effectiveness of an ad campaign, is the use of coupons. In this scheme, a visitor to an advertising website selects a hyper-text link corresponding to a product or offer, and prints out on a printer attached to her computer a corresponding coupon. Typically, this coupon bears the name of the product, the offer made by the merchant and an identifier that identifies to the merchant which advertising website the coupon was printed from. The merchant then redeems the coupon by making the sale to the customer. The merchant is able to track the number of times a customer visits an advertising website and elects to purchase merchandise from the merchant by the number of coupons received. However, this scheme requires the customer to physically travel to the merchant's store or business in order to redeem the coupon, thus eliminating the advantages of conducting business on the Internet.

One way to avoid traveling to a merchant's store is to provide e-coupons for on-line purchases. However, such an arrangement still does not measure the effectiveness of the advertising campaign accurately. For example, the campaign sponsor may not have enough information as to the type of viewers who looked at the advertising, and circumstances in which those who viewed the content, proceeded with using the coupon.

Another advertising scheme that is employed on the Internet to determine the effectiveness of an advertising campaign is the use of click-through advertising banners on a particular advertising website. The advertising website may be any publisher website, such as the homepage of an Internet service provider. A click-through banner is a display message that is linked via hyper-text markup language (hereinafter "HTML") to the website of the merchant displayed thereon. For instance, an advertising banner located on one website may display an advertisement for a product such that, when a web user currently using the website clicks on the advertising banner, the user is connected to the website of the merchant. A revenue is typically paid by the merchant to the advertiser depending on the number of times that the merchant's site is visited via the advertiser's click-through banner.

This scheme of advertising may be unsatisfactory for many advertising campaign purposes. For example, the scheme has not proven effective in generating user interest—click through rates for banner advertisements fell from 2.0% in 1998 to 0.15% in 1999. Furthermore, the scheme does not differentiate between visits that are successful, i.e.—in which a purchase is made during the visit, and those that are unsuccessful. By failing to provide this information, the scheme is economically unpredictable, in that the cost to the merchant of the advertising is not necessarily proportional to the revenue generated by the merchant by sales to click-through customers. This scheme also does not differentiate between a "human visit", in which a person or potential customer is viewing the site, and a "computer visit", in which an advertiser employs a traffic anonymizer to generate a large number of customer-less click-through visits. A traffic anonymizer prevents the merchant from determining the originator of a click-through visit.

Another problem with current merchandising campaigns on the Internet is that once merchandising content is distributed to an advertiser, the merchant loses control of the content. In other words, the merchant cannot readily modify the merchandising content without obtaining the cooperation of the advertiser to discard the old merchandising content and to embed new merchandising content on a timely fashion. Furthermore, this scheme creates an incentive for an advertiser to lure web users to click the advertising banner while visiting the advertiser's website. For instance, if unbeknownst to the merchant, an advertiser displays a false advertising claim in the advertising banner connected to the merchant's website (e.g.—the banner reads "FREE CD's" when in fact the merchant is not offering free CD's), visitors to the advertiser's site may be misled into using the click-through banner. In this case, the merchant will pay the advertiser for receiving a visit which generates bad will rather than a sale.

Therefore, there exists a need for a system and method that provides an improved scheme for web advertising and provides a dynamic control over the contents of the advertising campaign.

SUMMARY OF THE INVENTION

The present invention, in accordance with various embodiments thereof, is directed to an on-line system and method for assembling, storing and administering all of a company's merchandising content in a single location and for optimizing the effectiveness of the content by determining the content and format most likely to be of interest to the consumer.

Generally, a merchant sets up at least one campaign in the system, by generating various objects and/or resources comprising merchandising content. The merchant and/or its advertiser then establishes a set of rules which are applied to determine the objects and resources of the campaign to be distributed to a consumer, based on various circumstances and scenarios. When the consumer interacts with the system, the system determines dynamically the merchandising content to be sent to the consumer by processing data corresponding to the consumer, the consumer's computer system and environmental and geographical data.

Upon the consumer responding to the content, the system captures and processes data corresponding to the success of the merchandising object, and correlates the success of the merchandising object to the various types of consumer data, such as the time, the weather, etc. The system reports to the merchant the effectiveness of the campaign, showing the correlation between the success of the merchandising objects that were transmitted to the consumers and the various types of captured consumer data. According to one embodiment, the system then automatically modifies the campaign in order to optimize the effectiveness of the campaign.

Unlike prior art systems, the present invention, according to one embodiment thereof, enables a merchant to manage and administrate all of its merchandising content via a single location. This eliminates the need for the merchant to duplicate the work to create and upload images, links and product data in different formats for distribution in the different distribution channels, thereby providing a significant savings in cost. The present invention, according to one embodiment thereof, also enables a merchant to control its merchandising content even after it has distributed the content to its distribution channels, insuring that timely, meaningful merchandising is performed through the merchant's entire on-line presence. Furthermore, the present invention, in accordance with one embodiment thereof, provides detailed customer segmentation which may dramatically improve click-through and buy-through rates, by employing relevant consumer data, consumer system data, environmental and geographical factors, etc.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may be further understood by reference to the remaining portions of the specification and the accompanying drawings in which:

DETAILED DESCRIPTION OF THE DRAWINGS

As will be discussed further below, the system and method of the present invention, according to one embodiment thereof, may be employed to assemble, store and administer merchandising content in a single location. According to another embodiment, the system of the present invention may also be employed to generate detailed reports of the effectiveness of merchandising content, and to automatically and dynamically alter the content to achieve optimal effectiveness. It is noted, however, that the present invention is not intended to be limited in scope by the embodiments described herein, but can also be employed in many other ways. Some of these ways are discussed in more detail below.

Figure 1A:
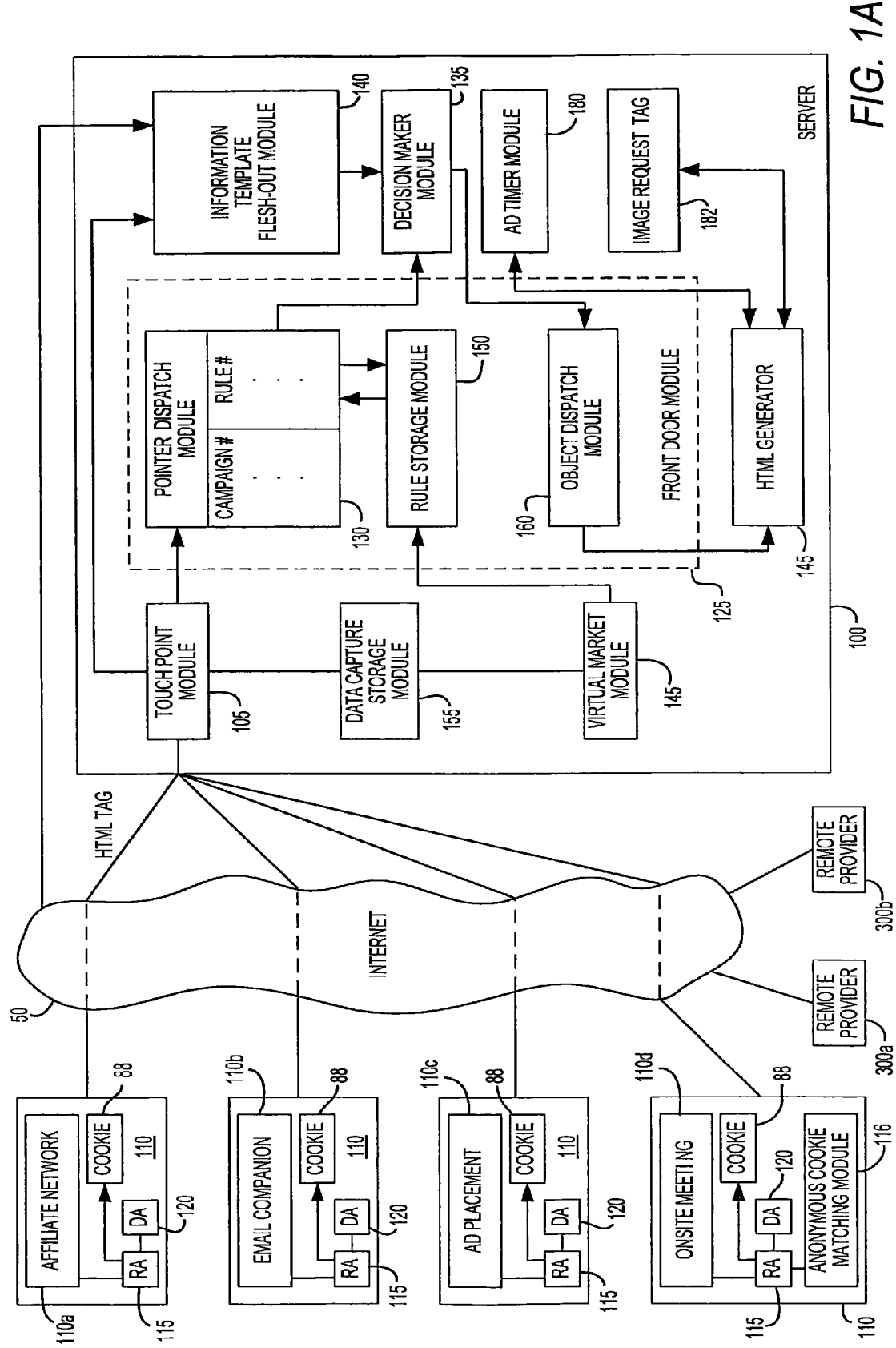
FIG. 1 is a diagram that illustrates the various components of an on-line system for dynamically segmenting and presenting content, according to one embodiment of the invention.

FIG. 1 is a diagram that illustrates the various components of system 10, according to one embodiment of the invention. System 10 comprises a server 100, which includes various modules which are configured to perform the operations of the system. However, it is noted that the present invention also contemplates that server 100 does not comprise discrete operational modules as shown in FIG. 1, but instead employs any combination of hardware and software to perform the operation of the system.

A plurality of users 110, receive advertising content via various distribution channels, such as affiliate network arrangement 110a, e-mail arrangement 110b, advertising placement 110c, and on-site marketing 110d. Each of these advertising contents include information that correspond to a request, that routes a user's browser to server 100, whenever the content is displayed on the user's monitor.

Affiliated network 110a (such as LinkShare™, Commission Junction™ and BeFree™) are sites that provide advertising space in exchange for commissions on sales driven through their links. Thus, they provide tracking technology that allows affiliate sites to refer consumers and to share in any revenues that are generated thereby. Direct marketers 110b (such as DigitalImpact™, CheetahMail™ and FloNetwork™) are systems that assist in creating managing and distributing direct e-mail and newsletter campaigns, often to large numbers of potential consumers.

Advertising networks 110c (such as DoubleClick™, EngageMedia™, AvenueA™ and 24/7™) broker space between publishers and companies by matching publisher inventory with advertiser branding. Finally, on-site marketing 110d may comprise a merchant's own on-line web site, thus enabling a company to use its own site management system to allow their merchandisers to utilize space allocated to promotions.

In the embodiment shown, server 100 comprises a touch point module 105, also referred to as a user terminal interface module. Touch point module 105 is configured to interact with a user's terminal to determine whether a cookie has been set for such a user, and if not proceed with setting one for a first time user whose browser has accessed server 100. Touch point module (user terminal interface module) 105 is also configured to receive and process relevant user information, for use by server 100 as will be explained in more detail hereinafter.

As part of setting such a cookie, touch point module 105 determines whether a user's system has a cookie text corresponding to server 100. For a first time user, touch point module 105 transmits a research assistant module 115 to the user's system 110. Research assistant module 115 includes a geographic intelligence system 120, such as those provided by Digital Envoy company. Briefly, geographic intelligence system 120 is configured to instantly determine the precise global geographic location (country, region and metro-area), as well as the connection speed of user system 110.

Research assistant module 115 sets a cookie text 88 that can be used by server 100 every time an advertising content with a request to interact with server 100 is displayed on user system 110. The cookies can be set to expire periodically, such that the information they contain is always up to date. The manner in which touch point module 105 obtains user information is discussed in greater detail below.

Touch point module 105 is further coupled to and communicates with research assistant module 115. Research assistant module 115 is an application which causes a user to provide user information. Although FIG. 1 shows research assistant module 115 as residing on the website in the distribution channel, such as 110, the present invention contemplates that, in accordance with yet another embodiment, research assistant module 115 may also reside on server 100.

Research assistant module 115 is coupled to geographic intelligence module 120, which in turn is coupled to a third party consumer data storage module. Geographic intelligence module 120 is an application which obtains user information from a third party for employment by server 100.

Research assistant module 115 also uses anonymous cookie matching module 116 in accordance with one embodiment of the invention. Anonymous cookie matching allows Research Assistant to gather additional information on a user. Companies such as Cogit provide access to user profile information that has been stored in their company's cookie. This profile information is obtained by initiating a browser redirect to Cogit, with Cogit returning the profile information back to the Research Assistant or directly to the Server 100. Cogit is one example. Anonymous cookie matching can also work with any $3^{rd}$ party that has placed a cookie of information on a user's terminal.

Touch point module 105 is also coupled to front door module 125. Front door module 125, also referred to as the content administration module, is configured to process a request for merchandising content. Front door module 125 includes a pointer dispatch module 130. Pointer dispatch module 130 includes a table that stores a plurality of campaign numbers, and corresponding rule numbers for each campaign number. Each advertiser may create many advertising campaigns for distributing over the Internet. Each campaign is identified by a campaign number.

To this end, pointer dispatch module includes a design interface module 128, so as to allow an advertiser to interact with server 100 to design a plurality of advertising campaigns that can be dynamically selected as will be explained in more detail below. For each of these campaigns, few rule sets can be assigned. A rule set is defined as a collection of rules that determine the advertising content that is displayed on a user's system.

A rule storage module 150 is coupled to pointer dispatch module 130 for storing the rule sets corresponding to each rule number. Furthermore, an object dispatch module 160 is configured to store a plurality of advertising objects which are selectable to be displayed on a user's system.

Pointer dispatch module 130 is coupled to a decision maker module 135, which in turn is coupled to information template flesh-out module 140. Decision maker module 135 is configured to receive a corresponding rule set from rule storage module 150. The decision maker module is also configured to receive information from information template flesh-out module 140 relating to each of the rules in the rule set. Based on this received information, decision module 135 determines which object is displayed on the user's system from the plurality of objects identified in object dispatch module 160.

Server 100 also includes a data capture storage module 155 configured to store data corresponding to the user's interaction with the item of merchandising content, e.g.—who saw the item, did the viewer order or click-through, etc.

Server 100 further includes a virtual marketer module 145 coupled to pointer dispatch module 130, rule storage module 150 and data capture storage module 155. Virtual marketer module 145 is configured to process the data received from these other modules and to determine, according to one embodiment of the invention, whether and to what extent an advertising campaign is effective, and to automatically and dynamically modify the advertising campaign to be optimally effective, as will be explained in greater detail below.

Object dispatch module 160 is coupled to an HTML generator 165 in order to generate appropriate HTML templates that are populated by corresponding objects to be displayed to the user. As will be explained in greater detail below, objects are data files corresponding to an item of merchandise that are displayed to a consumer. Object dispatch module 160 is also coupled to third party resource providers 300, which provide objects not stored internally in server 100.

Server 100 also includes an Ad Timer module 180 and an image request tag module 182, both of which are coupled to HTML generator 165. Ad Time module 180 is configured to generate a small component of the advertising content, that is included with the HTML generator that is being sent to the user. The component includes a small object, invisible to the user, that is displayed along with the advertising content. The component also includes an executable file, such as a javascript, that prompts the user's browser to periodically send a request to server 100, as long as the advertising content is displayed via the user's browser, as will be explained in more detail in reference with FIG. 4.

Similarly, image request tag module 182 is configured to generate a small component of the advertising content, that is included with the HTML generator that is being sent to the user. The component includes a small object, invisible to the user, that is displayed along with the advertising content. The component includes an executable file, such as a javascript, that prompts the user's browser to send an indication signal when a user clicks on the advertising content, to indicate that a particular user's device clicked to a site, via an advertising content displayed or handled by server 100.

It is noted that the function of modules 180 and 182 in accordance with one embodiment of the invention can be handled by one module that handles both arrangements described above. That is, tracking the time that a particular content was actually displayed and tracking the click throughs to a designated site, via the advertising content being displayed.

FIG. 1b illustrates an exemplary rule storage module 150 in accordance with one embodiment of the present invention. Rule storage module 150, preferably comprises a table, having a rule # field, and corresponding rule set, size and restriction fields. Each rule set is preferably created by an advertiser, so as to select an advertising content based on certain external and internal information relating to the user.

FIG. 1c illustrates an exemplary object dispatch module 160 in accordance with one embodiment of the present invention. Object dispatch module 160, preferably comprises a table, having an object #field, and corresponding object type, resources, and attribute fields. Each object # is preferably created by an advertiser, along with the type of the object and the resource locations from which these objects can be obtained.

Figure 2:
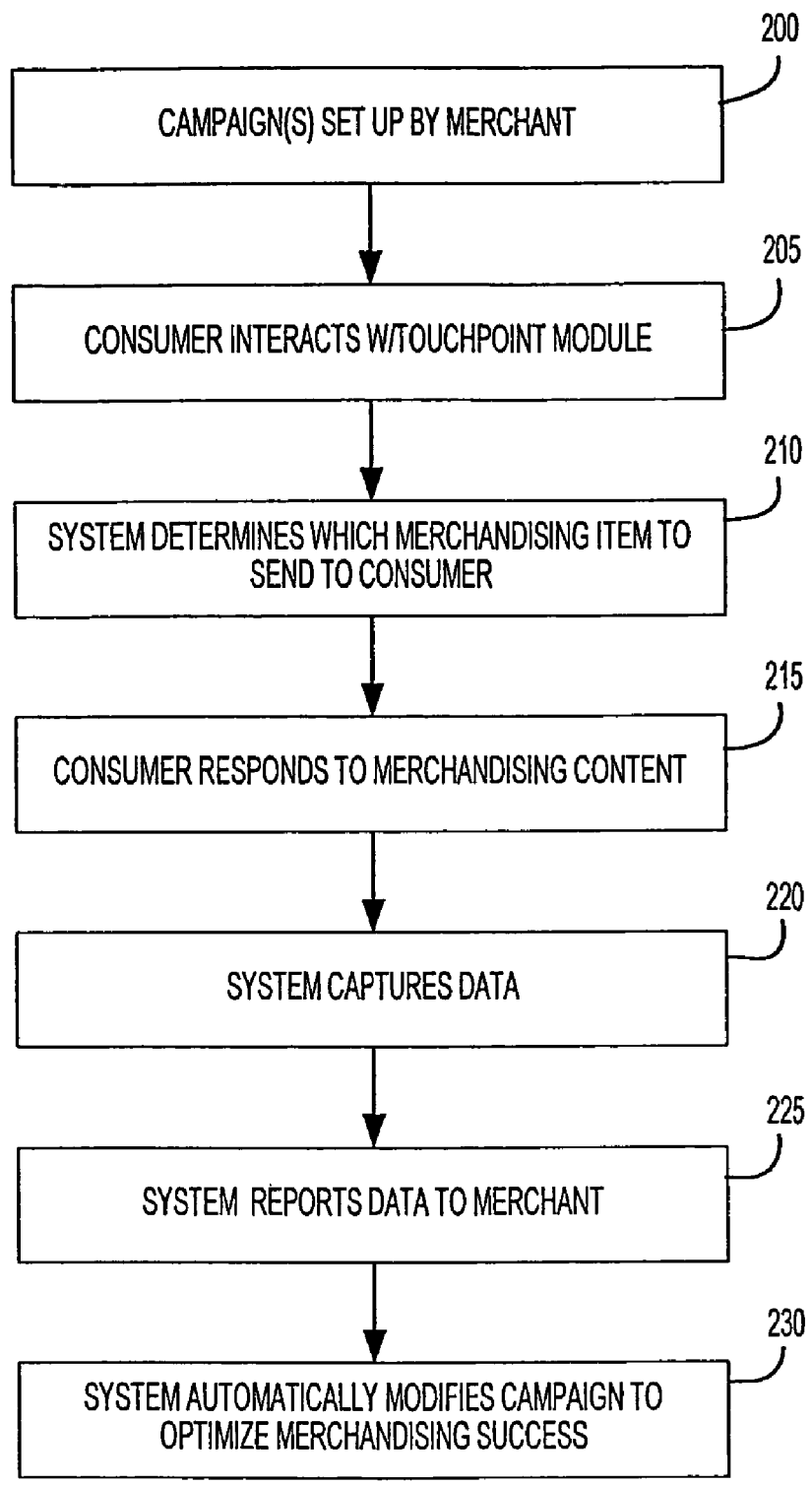
FIG. 2 is a flowchart that illustrates the steps which are performed by the system of the present invention, in accordance with one embodiment.
Figure 3:
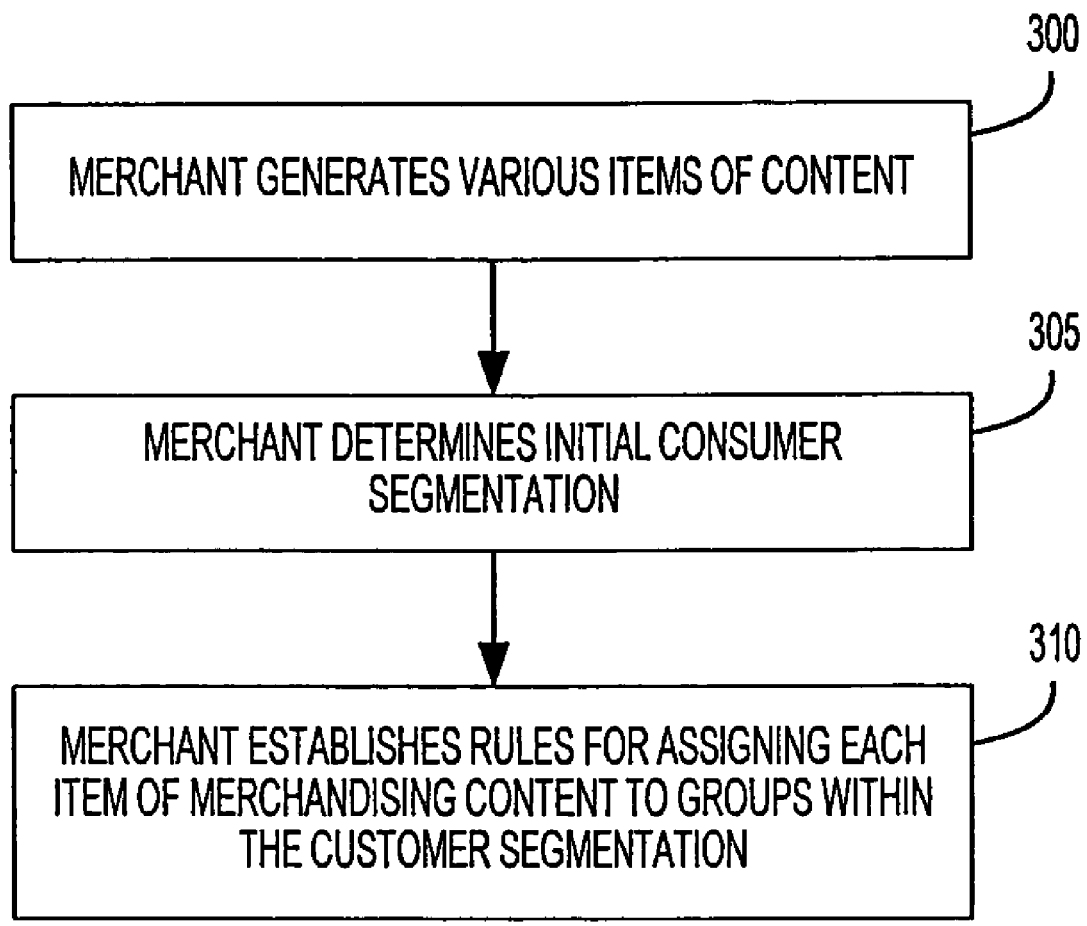
FIG. 3 is a flowchart that illustrates the steps that are performed by a merchant to set up a merchandising campaign, according to one embodiment of the invention.

FIG. 2 is a flowchart that illustrates the steps which are performed by the system of the present invention, in accordance with one embodiment. Specifically, FIG. 2 illustrates the steps which may be performed in order to optimize a merchant's extended on-line presence (i.e.—to maximize the effectiveness of the merchant's content which is transmitted to consumers via its various distribution channels). At step 200, a merchant sets up at least one campaign in the system. A campaign is the highest level of a merchandising scheme. In order to perform this step, the merchant generates various objects and/or resources comprising merchandising content and establishes the rules which are to be applied in determining under what circumstances the objects and resources of the campaign are to be distributed to a consumer. It is noted that server 100 is employed to create a desired advertising campaign for all available distribution channels. The steps which are performed by a merchant in setting up a campaign in the system are illustrated in the flowchart of FIG. 3, discussed in greater detail below.

At step 205, a consumer interacts with touch point 105. As previously discussed, touch point 105 is any link to server 100. FIG. 1 illustrates several channels by which a consumer may interact with touch point 105. For instance, a user may interact with touch point 105 by clicking an advertising banner at an affiliated network 110*a*, by responding to an e-mail or newsletter campaign distributed by a direct marketer 110*b*, or by clicking on a link on the merchant's own website. Of course, these are only some of many conceivable ways that a consumer may interact with touch point 105, and the present invention is not intended to be limited to only the ways listed herein.

At step 210, the system determines which object of merchandising content to send to the consumer. In order to perform this step, the system processes data corresponding to the consumer. Research assistant 115 is employed to collect all the pertinent information for selecting an appropriate advertising content. Preferably, the consumer data which is processed by the system may comprise a wide variety of data, such as demographic information, e.g.—the consumer's age, economic status, residence, language of preference.

Preferably, research assistant 115 is capable to obtain consumer data, which is gleaned from the consumer's computer system and environmental data from third party data sources. A sample of collected information, in accordance with one embodiment of the invention includes, but is not limited to:

the time of day;
the weather in the consumer's geographical location;
local news;
stock prices and information;
the hardware profile of the consumer's system (e.g.—operating system, processing power, etc.);
screen resolution of consumer's monitor;
IP address;
geographic location of the user's system based on geographic data module 120;
bandwidth capability (e.g.—such as by examining the network path which has been employed by the IP address); and
plug-in programs supported by the system; etc.
any anonymous cookie profile information, including, but not limited to, gender or spending patterns
history of the ads that a user has seen from the system and a history of the ads that the user has clicked on, including the type of ad and the time the ad was seen Of course, these are only some of many conceivable types of consumer data, consumer system data, environmental and geographical data, etc. that may be processed, and the present invention is not intended to be limited to only the types listed herein. In addition, the system processes the campaign and object rules that have been established by the merchant.

Figure 4:
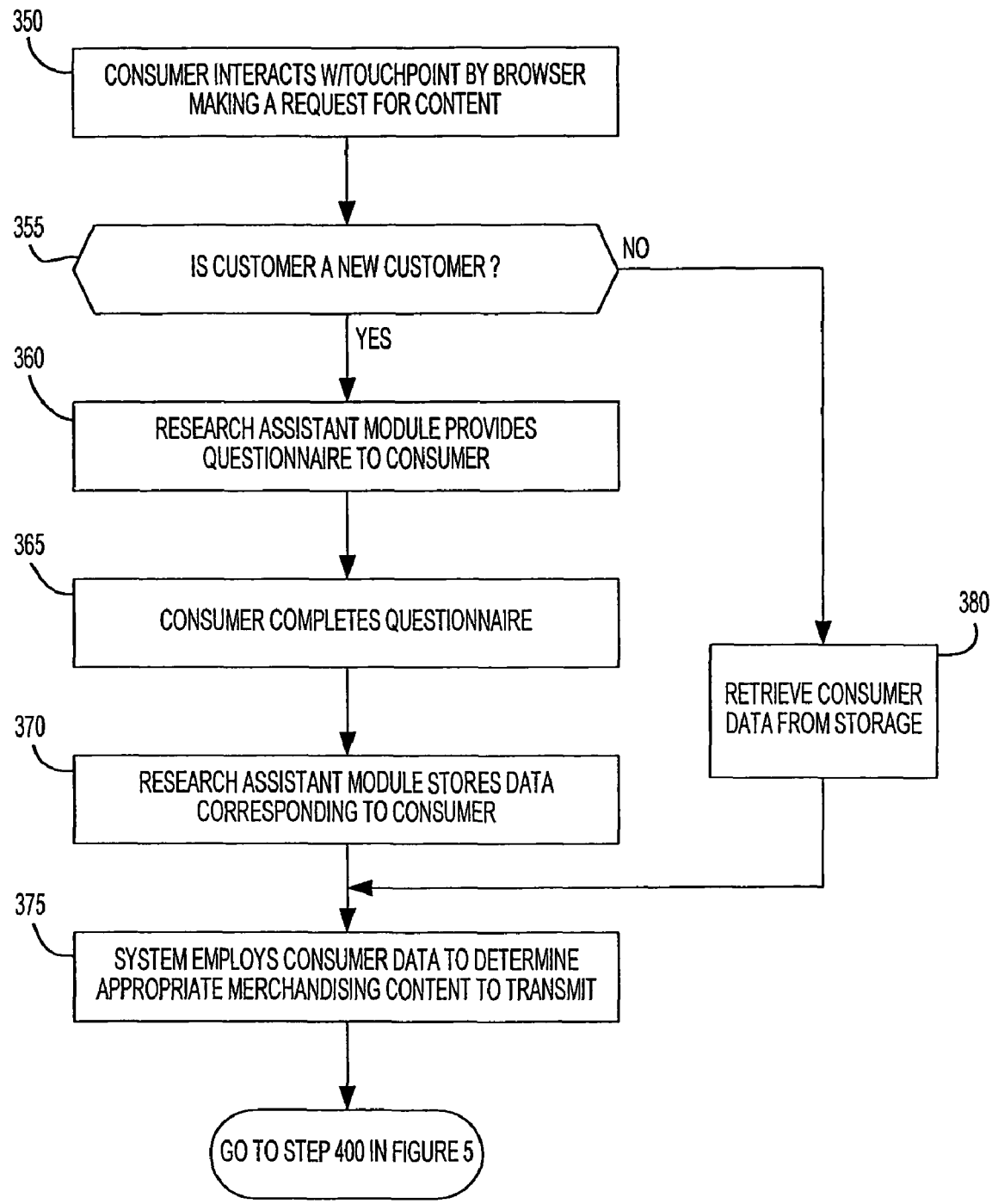
FIG. 4 is a flowchart that illustrates the steps that are performed by the system in order to glean data corresponding to the consumer, according to one embodiment of the invention.

The steps which are performed by the system in order to determine which object and resource of merchandising content to send to the consumer are illustrated in the flowchart of FIG. 4, which is discussed in greater detail below.

At step 215, the consumer either responds, or fails to respond, to the merchandising content. For instance, the consumer may respond by clicking on the advertising content and/or initiating the purchase of a product advertised by the merchandising content, or else may fail to respond by ignoring the merchandising content and clicking elsewhere.

At step 220, the system captures and processes data corresponding to the success of the merchandising object. For instance, according to one embodiment of the invention, the system captures data corresponding to which object was transmitted to the consumer, and whether the consumer responded to the object by clicking on the advertising content and/or ordering merchandise. In addition, the system is also configured to correlate the success of the merchandising object to the various other types of consumer data, such as the time, the weather, etc. As stated above, these are only some of many conceivable data correlations that may be established, and the present invention is not intended to be limited to only the correlations listed herein.

At step 225, the system reports the effectiveness of the campaign. Specifically, the system, according to one embodiment, is configured to generate a report which shows the correlation between the success of the merchandising objects that were transmitted to the consumers and the various types of captured consumer data. Thus, a merchant can be advised via the report whether a particular merchandising object was more or less successful at a specific time of day, during rainy or sunny weather, for persons living in a particular location or speaking a specific language, etc.

At step 230, the system automatically modifies the campaign in order to optimize the effectiveness of the campaign. Specifically, if the report generated by the system shows a correlation between the success of the merchandising object at a specific time of day, the system may be configured, according to one embodiment, to automatically modify the campaign to deliver that merchandising object at that time of day. Similarly, if the report generated by the system shows a correlation between the success of the merchandising object during a type of weather or with persons that speak a particular foreign language, the system may be configured to automatically modify the campaign to deliver that merchandising object during similar weather or to other persons that speak the same foreign language. Of course, as stated above, any type of correlation may be established by the present invention, and the system may be configured to automatically modify campaigns based on various predetermined criteria. Furthermore, the present invention may be configured such that modification of the campaign is not automatic, but is performed by the merchant instead.

As explained above, it is noted here that the types of consumer data, consumer system data, geographical or environmental data, etc. which is obtained by research assistant 115 and processed by the system of the present invention is preferably employed in at least three ways. First, it may be employed in establishing rules which determine what merchandising content should be transmitted to a particular consumer. For instance, a merchant may establish as a rule for distributing content that, if the weather is "sunny", content related to swim wear is to be transmitted to a consumer.

Second, the data may be employed in providing a detailed report of the effectiveness of a campaign. For instance, the system may report to a merchant that content related to sneakers is relatively more effective (i.e.—more consumers click through and purchase sneakers) when the weather is "sunny" as compared to when the weather is "rainy", or that, when the weather is "rainy", content related to fictional books are relatively more effective than content related to non-fictional books.

Third, the data may be employed as content in and of itself and may be displayed to the consumer. According to one embodiment, the system may provide a window on the consumer's screen in which the data is displayed to a consumer. For instance, the system may provide a stock ticker which displays real-time stock prices, or else may provide a "weather" window in which current local weather is displayed.

Thus, by employing various types of consumer data, consumer system data, geographical or environmental data, etc. in at least these three different ways, as described above, the present invention significantly improves upon systems of the prior art. For instance, while other systems of the prior art provide reporting, they typically report on the effectiveness of an item of merchandising content as correlated with basic consumer demographic information only, such as the consumer's age or geographical location. While this correlation may be significant, it does not provide a merchant with enough data to effectively target the distribution of merchandising content to the consumers that are most likely to buy its products. External or environmental factors, such as the time of day, the weather, the language spoken by the users, etc. may effect the viewing or purchasing habits of consumers, but systems of the prior art do not provide any correlation between these factors and the effectiveness of the campaign.

Similarly, while other systems of the prior art may enable a merchant to establish rules for determining which items of merchandising content to send to a particular consumer, these rules are again typically based on basic consumer demographic information only, such as the consumer's age or geographical location. While these rules may help a merchant to target the distribution of merchandising content to the consumers that it believes are most likely to buy its products, they fail to account for numerous other factors that may be relevant in determining the likelihood of a consumer being interested in an item of merchandising content.

For instance, a merchant employing a prior art system may establish a rule that a merchandising item related to a state-of-the-art flat screen computer monitor is transmitted to all consumers that are aged 35 years or older, employing the rationale that a business person is more likely to be interested in the monitor and that most business people are older than 35 years of age, or that a person that is 35 years of age or older is likely to be able to afford the monitor. Of course, since there are numerous 35 year olds that have no interest in computer technology or that cannot afford the monitor, a rule based on the age of a consumer is not likely to be effective.

On the other hand, the system of the present invention, according to one embodiment thereof, is configured to allow research assistant 115 to obtain and process the users' system data specifications in order to determine the resources available to a user computer with, for instance, the highest currently available level of processing power (or a conventional CRT monitor, or a VRML plug-in, etc.). These factors are likely to be much more relevant in determining whether a consumer is interested in a state-of-the-art monitor than the consumer's age. Thus, the system of the present invention enables a merchant to establish a rule that a merchandising item related to a state-of-the-art flat screen computer monitor is transmitted to all consumers that are using a computer with the highest currently available level of processing power, or a conventional CRT monitor, a VRML plug-in, etc. The system is then configured to test the effectiveness of these rules by generating a report showing these more relevant correlations, and to modify the rules if necessary to optimize the effectiveness.

As previously mentioned, the flowchart illustrated in FIG. 3 shows the steps which are performed by a merchant in setting up a campaign in the system. A campaign is the highest level of a merchandising scheme. At step 300, the merchant generates various objects and/or resources comprising templates for displaying merchandising content and the merchandising content itself. At step 305, the merchant determines an initial customer segmentation. In other words, the merchant determines how to divide the customers which are likely to encounter its merchandising content via the various distribution channels. Thus, the merchant may initially segment its customers into a first group comprising "men" and a second group comprising "women".

At step 310, the merchant establishes a set of rules which are to be applied in initially determining under what circumstances the objects and resources of the campaign are to be distributed to a consumer. Thus, when a consumer who is a man requests content, the consumer will receive merchandising content which the merchant has initially determined to have a high likelihood of success when directed to men, while when a consumer who is a woman requests content, the consumer will receive merchandising content which the merchant has initially determined to have a high likelihood of success when directed to women. As will be discussed in greater detail below, the merchant will be able to modify these rules in accordance with the actual success of the merchandising campaign, or else the system is configured, according to one embodiment, to automatically modify the rules so as to optimize the effectiveness of the merchandising.

FIG. 4 is a flowchart that illustrates the steps that are performed by the system in order to glean data corresponding to the consumer, according to one embodiment of the invention. At step 350, a consumer interacts with touch point module 105 of server 100. This step occurs after the user's system browser has downloaded a web page from a website that has been previously modified so as to embed a request code to server 100 for a desired advertising campaign related to a participating merchant. As a result when that page is downloaded, the user's browser communicates with touch point module 105 in order to make a request for content corresponding to the advertising campaign so as to display the content in a designated area on the downloaded page. For example that designated area may be a location on the display where banner ads appear.

Next, the system proceeds to step 355. At step 355, touch point module 105 determines whether the consumer is a new user. In other words, touch point module 105 determines whether the consumer has previously contacted server 100. Server 100 preferably handles this determination by employing a cookie arrangement. Thus, if the user's browser sends a cookie corresponding to server 100, touch point 150 determines that this is not a first time user.

If the consumer is a new user, the system proceeds to step 360. At step 360, server 100 sends a research assistant module 115 in a form of an executable file or a plug-in configured to glean information about the consumer and the consumer's system. According to one embodiment, research assistant module 115 performs this step by providing the consumer with an information questionnaire. Advantageously, the questionnaire comprises fields which require the consumer to provide personal data, such as name, address, age, sex, language, etc. Furthermore, research assistant module 115 interacts with the user's system to determine the resources available to the user's computer, such as for example, information relating to the CPU, motherboard, memory, plug-ins, modem connection, etc. This information may be used not only for determining the content of advertising material but also the format and style of the content to be sent to the user's browser. Research assistant module 115 also includes a geographical locator unit 120, such as Digital Envoy, to determine the user's geographical location, and as a result, the user's weather, time and other geographically dependent information.

At step 365, the consumer fills in the requested data. At step 370, research assistant module 115 stores the consumer's data in a storage location 88 associated with the consumer's "cookie". As previously noted, the data which may be stored in connection with a particular consumer may include not just data provided by the consumer in response to a questionnaire, but also data corresponding to the consumer's computer system, data corresponding to the purchases that the user has previously made, environmental or geographical information corresponding to the consumer, etc. At step 375, the system employs the consumer's data to determine which merchandising content to transmit to the consumer.

If, at step 355, touch point module 105 determines that the consumer is not a new user, the system proceeds to step 380. At step 380, the system retrieves the consumer's data from the storage location associated with the consumer. Advantageously, this data is retrieved by the system using the consumer's "cookie". Upon retrieving the data, the system proceeds to step 375. As previously mentioned, at step 375, the system employs the consumer's data to determine which merchandising content to transmit to the consumer. The system then proceeds to step 400 of the flowchart illustrated in FIG. 5.

Figure 5:
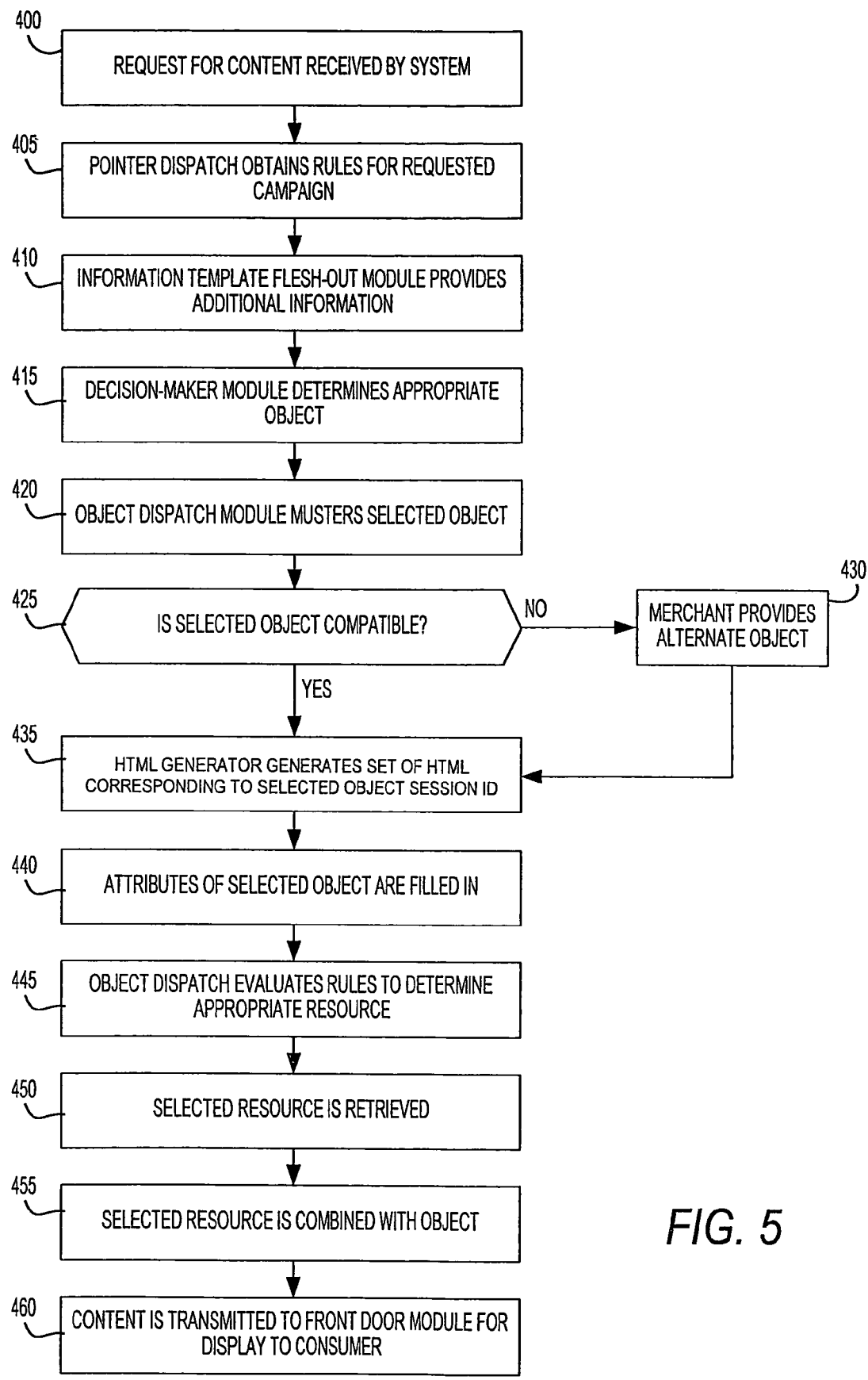
FIG. 5 is a flowchart that illustrates the steps which are performed by the system in order to determine which merchandising content to send to the consumer, according to one embodiment of the invention.

As stated above, FIG. 5 is a flowchart that illustrates the steps which are performed by the system in order to determine which merchandising content to send to the consumer. At step 400, a request for merchandising content is received by system 10. The request for content is typically a request for a campaign number, and the request is made by a consumer via one of the previously discussed distribution channels.

At step 405, pointer dispatch module 130 obtains the rules for the requested campaign. These rules are stored in rule storage module 150. At step 410, information template flesh-out module 140 provides pointer dispatch module 130 with additional information which may be relevant in determining which object of merchandising content is to be sent to the consumer. For instance, in one embodiment of the invention, information template flesh-out module 140 provides information concerning the last item of merchandising content that was received by the consumer, so as not to transmit the same item twice. Alternatively, in another embodiment of the invention, information template flesh-out module 140 provides information concerning the time, the weather, or any other type of information which may be obtained and which is deemed relevant to the rule set corresponding to the requested campaign.

At step 415, decision maker module 135 determines, based upon the rules obtained from rule storage module 150 and the information provided by information template flesh-out module 140, which object is to be employed. Server 100 stores information relevant to each object based on the object number in object dispatch module 160. An object is a template which provides a means, such as a window, for displaying merchandising content to the consumer. Each object number includes at least one corresponding object type, at least one corresponding object resources and at least one corresponding object attribute.

As a result, and in accordance with one embodiment of the invention, object dispatch module 160 identifies the object type (e.g.—image link, Flash, etc.). Preferably, object dispatch module 160 also identifies the information corresponding to which resources a selected object is associated with so as to allow server 100 to retrieve the object from the corresponding location of the resource. Object dispatch module 160 also identifies the attributes of the object.

At step 425, decision maker module 135 determines whether the selected object is compatible with the consumer's system. For instance, if the object type of the selected object is an image link, decision maker module 135 determines whether the consumer's system is capable of, e.g.—has the software and processing power, to display the image link. If decision maker module 135 determines that the selected object is not compatible with the consumer's system, then the system proceeds to step 430. At step 430, the merchant provides an alternative object to be displayed to the consumer, before proceeding to step 435. For instance, if the selected object is a template for streaming video and the consumer's system does not have the processing power necessary to display the streaming video, then the merchant may provide an alternative such as a template for still image files which the consumer's system is capable of processing.

If decision maker module 135 determines that the selected object is compatible with the consumer's system, then the system proceeds directly to step 435. At step 435, HTML generator 165 generates a set of HTML corresponding to the object to be displayed to the consumer (either the originally selected object or the alternative object), along with a session ID# as will be explained in more detail below. At step 440, the system fills in the attributes of the selected object, e.g.— whether the template is a new window, current window, etc.

At step 445, based on the object number selected by decision maker module 135, object dispatch module 160 determines which resource is to be employed. Resources are data which is employed to fill the object template. In a preferred embodiment, a resource is an image. The system may employ resources which are stored internally, or else may provide a path to an externally stored resource. As discussed previously in connection with objects, the rules associated with an object are stored in rule storage module 150, and are employed to determine the appropriate resource to fill the object template.

The ability to retrieve data objects, such as images or multimedia content obtained from a resource which may be remote from server 100 provides a remarkable improvement in advertising delivery over prior art. To this end, an advertising content can retrieve dynamic and timely information from a resource and display that information along with other advertising content, corresponding to various data objects. For example, an advertising campaign can now include delivery of on-line weather or financial information in addition to other advertising content, which can be changed in accordance with various rules sets.

At step 450, the appropriate resource is selected and transmitted to object dispatch module 160. At step 455, the selected object template is filled by the resource. At step 460, the filled template is transmitted to the front door module, where it is transmitted to the consumer for display.

One of the benefits of the present invention, according to one embodiment, is that the system enables the merchant to maintain control over its merchandising content and to quickly and easily modify it, if necessary, to optimize its effectiveness. This is evident from the following example. For instance, a consumer who is viewing a YAHOO! home page may click on an advertising link corresponding to a car manufacturer, such as Mercedes. The advertising link is connected to server 100 via the Internet, and communicates with touch point module 105, which receives the request for content. Touch point module 105 employs research assistant module 115, geographic intelligence 120 and information template flesh-out module 140 to compile data corresponding to the consumer, the consumer's computer system, and any environmental or external factors that may be relevant.

Advantageously, the car manufacturer (referred to below as the "merchant") has previously established rules which are employed by the system in determining which object to transmit to the consumer. For instance, the merchant may have established a rule that, upon ascertaining the location of the consumer, a template which includes the name and address of the merchant's nearest dealer is to be employed. Other rules may govern the object template, e.g.—image link, Flash, etc., which is to be employed, based upon the consumer's computer system data.

The merchant has also previously established rules which are employed by the system in determining, for a selected object, which resource is to be transmitted to the consumer. For instance, the merchant may have established a rule that, upon ascertaining that the weather in the location of the consumer is "sunny", content associated with a convertible model is transmitted to the consumer, while upon ascertaining that the weather in the location of the consumer is "rainy", content associated with a hard-top model is transmitted to the consumer. Likewise, the merchant may have established a rule that, upon ascertaining the location of the consumer, content associated with the local dealer's inventory of cars is transmitted to the consumer.

Figure 6:
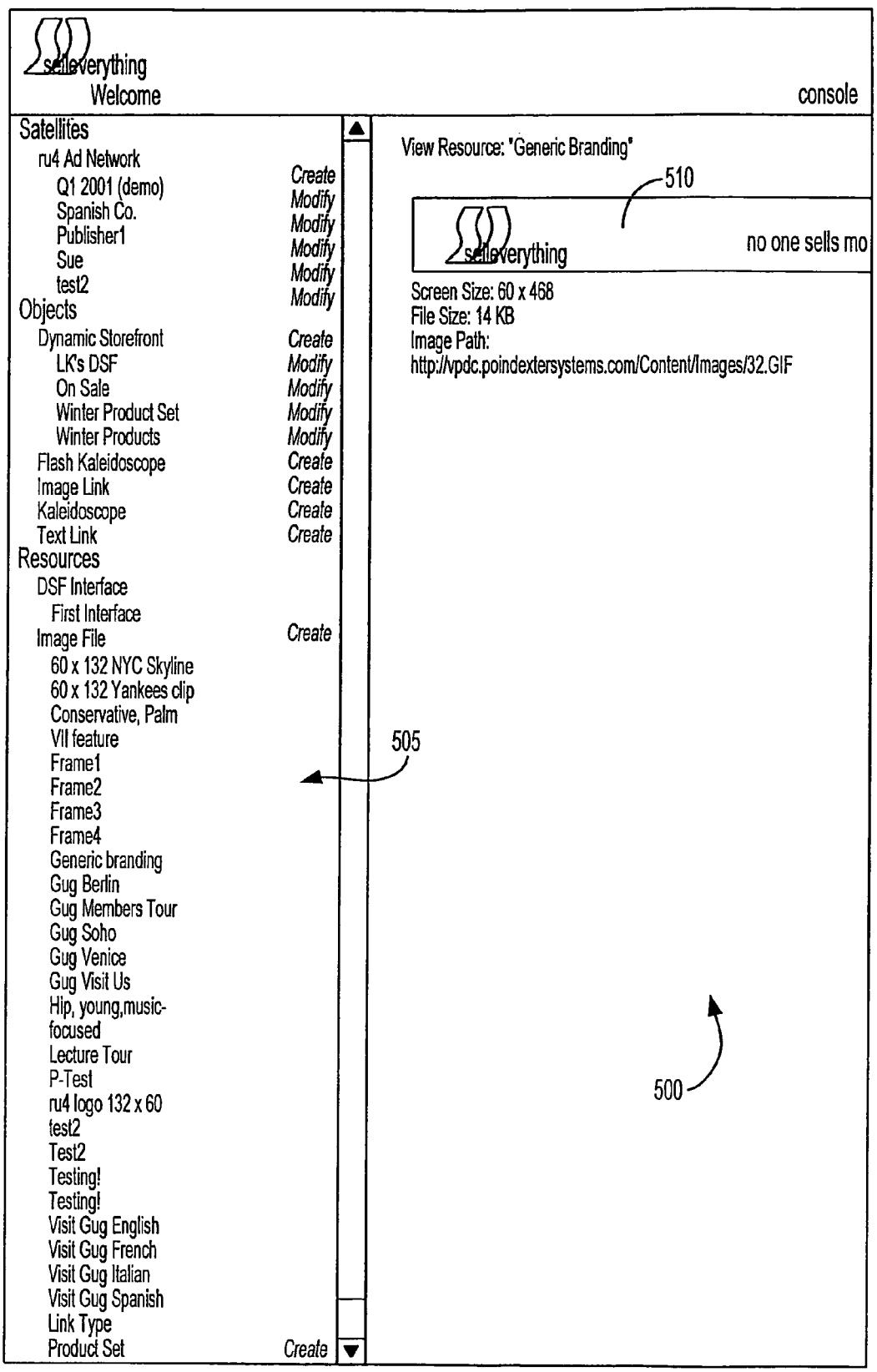
FIG. 6 illustrates an interface 500 which is employed by a merchant in order to view its campaigns, objects and resources, according to one embodiment.

FIG. 6 illustrates an interface console 500 which is employed by a merchant in order to create, modify and view its campaigns, objects and resources, according to one embodiment. Furthermore, the system is configured, according to one embodiment thereof, to provide interfaces for the merchant to establish and modify rules determining which campaign, objects and resources are to be transmitted to a particular consumer. The interface which is shown in FIG. 6 has menu portion 505 which lists the various campaigns, objects and resources created by the merchant. By clicking on the name of one of the campaigns, objects or resources, the merchandising content corresponding thereto is displayed on display portion 510. Display portion 510 may also display data corresponding to the displayed item, such as its screen size, file size, image path, etc.

An additional problem which is experienced by prior art systems is that they do not provide a confirmation to a publisher that an advertisement was actually displayed to a consumer. For instance, a user of a typical prior art system may click on a click-through banner to view merchandising content linked to the banner. However, the user may change his or her mind while waiting for the content to load, and may click something else or click on the "Back" button so as to stop the content from loading. If the user does this, the publisher site may still get credit for a click-through (e.g.—the publisher site may be paid for the number of click-throughs originating from its site) even though the consumer did not see the displayed merchandising content.

By contrast, in accordance with another embodiment of the present invention, the system is configured to provide a confirmation to a publisher (a site which publishes an advertisement link, such as YAHOO!, AvenueA, etc.) that an advertisement was actually displayed to a consumer. In this embodiment, pointer dispatch module 130 is configured to generate an additional set of HTML which includes information pertaining to the advertisement that was just served to a consumer. This set of HTML goes to the consumer's browser, which sends an additional request to the publisher site. Thus, in addition to transmitting information about what advertisement was displayed, this request also confirms to the publisher site that the advertisement was displayed.

In accordance with one embodiment of the invention, the arrangement for confirming delivery of an advertising content employs Ad Timer module 180. As such, an optional component of the content that is delivered to the consumer is an invisible Ad Timer object provided by Ad Timer module 180. This appears as a transparent 1 pixel wide by 1 pixel high image as part of the content. The component, which in one embodiment is built using javascript, periodically sends a request back to the server 100. These request include the length of time the ad has been displayed on the consumer's terminal. Therefore as part of the reporting an optimization that the system can do, it can accurately track the amount of time the content has been displayed on the user's terminal.

In addition, the ad timer is valuable for tracking the number of ads that actually made it to the consumer's terminal. Most prior art provide reports only on the number of ads sent from the server, with no indication of whether the content actually made it to the consumer's terminal. By using the ad timer, one can obtain with confidence the number of ads that were actually displayed on the terminal. In most cases, this latter number is what most interests the merchants.

It is noted that when server 100 generates the html to be sent to the user's terminal, it also generates a globally unique identifier which is used as a session id. The session id is unique for every ad delivered by the server, or group of servers. Since the ad has the session id, any subsequent interaction with the ad, such as clicking or measuring of duration uses this session_id. Subsequent requests made to server 100 for clicks or duration always send the session id along with the request. This allows the association of that ad with these other events.

Another of the challenges facing online advertising schemes is the difficulty for a merchant to determine whether a consumer has arrived at its website on its own, or whether the consumer arrived at the website by clicking through an advertising link at a publisher site. This is particularly problematic when a consumer sees an advertisement via an advertisement link on a publisher's site but does not make the purchase until several days or weeks later. Thus, a consumer may click-through the publisher's site and view merchandising content, but may opt to purchase the item several hours, days or weeks later. In this case, because the consumer did not make the purchase in the same session as when he performed the click-through, the publisher may not receive credit for the purchase which is eventually made.

By contrast, the present invention, according to one embodiment thereof, addresses this problem by employing an image request tag module 182. Preferably, the image request tag which is employed provides is a 1×1 pixel, along with a unique identification number. The displayed pixel is too small to be detected by the consumer. Thus, when a consumer clicks on an advertising link in a publisher site, the image request tag along with the consumer's cookie and the unique id is transmitted to and stored in server 100.

Then, at any future time, when the consumer purchases the advertised product from the merchant's website, a request is made by the merchant's browser to server 100. Preferably, this is accomplished by embedding the request to server 100 in the merchant's purchase order. Along with the request, the user's cookie 88 is also sent to server 100. Upon receiving the request at server 100, server 100 determines that the image request tag associated with the merchandise was previously stored for the consumer. Server 100 alerts the merchant's browser and/or publisher site that the consumer originally viewed the advertisement via the publisher's site.

In one embodiment, the present invention enables a merchant to use a Dynamic StoreFront which displays numerous products in an interactive and entertaining parade, via design interface module 128 (FIG. 1). Console 500 allows the advertiser to design various store fronts in accordance with one embodiment of the present invention. A store front relates to the appearance and format of the advertising content displayed on the user's system. This appearance and format is defined by the objects and identified by a corresponding object number. Therefore, not only the advertising content can be determined based on a predefined rule sets, but also the mode of their appearance in the form of a dynamic StoreFront can also be determined based on a predefined set of rules.

Thus, the present invention, according to one embodiment thereof, enables a merchant to manage and administer all of its merchandising content via a single location. By enabling a merchant to centrally manage merchandising content for distribution throughout all of its different distribution channels, a merchant is no longer required to duplicate the work to create and upload images, links and product data in different formats for distribution in the different distribution channels. For instance, according to the present invention, a merchant may create one rich media banner advertisement featuring specific products and use it for all of its distribution channels, e.g.—as an advertisement, an affiliate link, an e-mail enhancement and an on-line promotional tool. This may provide a significant cost savings in eliminating the need to create and administer multiple versions of fundamentally identical merchandising content.

Furthermore, the present invention, according to one embodiment thereof, enables a merchant to change content which is distributed through the various distribution channels. In prior art systems, after a merchant distributes content, it loses control over it, because it becomes the responsibility of the publisher or affiliate websites to update the merchandising content on their sites. The publisher or affiliate discards the old content and embeds new content at its convenience. By enabling a merchant to change content which is distributed through the various distribution channels, a merchant can ensure that timely, meaningful merchandising is performed through its entire on-line presence.

Most significantly, the present invention, in accordance with one embodiment thereof, provides detailed customer segmentation which may dramatically improve click-through and buy-through rates. Instead of meaninglessly dividing consumers into segments based only on the consumer's demographic information and prior purchases, the present invention enables the transmission of merchandising content to be dynamically segmented according to relevant consumer data, consumer system data, environmental and geographical factors, etc.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

We claim:

1. An on-line system for administering advertising content, the on-line system comprising:
    a server operatively connected to a user terminal operated by a user and including a browser, the server including:
    an advertising administration module, configured to maintain advertising content associated with at least one advertising campaign;
    a user terminal interface module coupled to said advertising administration module, said user terminal interface configured to retrieve user information corresponding to said user terminal, for use by said advertising administration module;
    a decision maker module in communication with the advertising administration module, said decision maker module configured to select advertising content associated with at least one advertising campaign, based on said user information including consumer data specific to the user and obtained at least directly from said user terminal, so that the user terminal in communication with the server and with a separate third party resource provider receives other content from the third party resource provider and receives the selected advertising content corresponding to the user information retrieved by said server; and
    an object dispatch module which remotely generates a display template in the browser of the user terminal, wherein the user terminal receives such advertising content from the advertising administration module as a first object, which is selected by the decision module, wherein the user terminal receives the other content in a data file as a second object from the third party resource provider with the second object not stored internally in the server, and wherein the object dispatch module remotely populates the display template with the first and second objects simultaneously at the user terminal to be conveyed to the user, thereby displaying the advertising content with the other content simultaneously in the browser.

2. The on-line system in accordance with claim 1, wherein said user terminal interface module provides a research assistance module to said user terminal, said research assistance module configured to retrieve a geographical location of said user terminal for use by said server.

3. The on-line system in accordance with claim 2, wherein said geographical location further comprises said user's metropolitan region.

4. The on-line system in accordance with claim 1, wherein said user terminal interface module provides a research assistance module to said user terminal, said research assistance module configured to retrieve system information corresponding to a system specification related to said user terminal.

5. The on-line system in accordance with claim 4, wherein said system information includes a hardware specification of a peripheral device in communication with the user terminal.

6. The on-line system in accordance with claim 1, wherein said advertising administration module further comprises: a memory unit that stores a set of rules corresponding to each of said advertising campaigns, said set of rules defining conditions for which specific advertising content is selected.

7. The on-line system in accordance with claim 6, wherein the server further comprises: an information template fleshout module in communication with the advertising administration module configured to retrieve information required by said set of rules.

8. The on-line system in accordance with claim 7, wherein the server further comprises: an ad timer module configured to provide a request component along with said selected advertising content, so as to track the time said selected advertising content is displayed on a display of said user terminal, as measured by periodic requests received by said server in response to said request component.

9. The on-line system in accordance with claim 8, wherein said request component includes a small object within said selected advertising content that appears invisible on the display of said user terminal.

10. The on-line system in accordance with claim 9, wherein said ad timer module tracks the amount of time said selected advertising content has been displayed on the display of the user terminal.

11. The on-line system in accordance with claim 9, wherein said ad timer module tracks the number of instances of advertising content that were displayed on the display of the user terminal.

12. The on-line system in accordance with claim 7, wherein the server further comprises: a request tag module configured to provide a request component along with said selected advertising content, so as to track the occurrence of a click through, when the user clicks on said selected advertising content.

13. The on-line system in accordance with claim 12, wherein said request component includes a small object within said selected advertising content that appears invisible on a display of said user terminal.

14. The on-line system in accordance with claim 13, wherein said request tag module correlates a purchase made at a website with said occurrence of a click through.

* * * * *